Sept. 4, 1928.

J. C. CARLTON 1,683,528

CLUTCH MECHANISM FOR REVERSING GEAR

Filed April 23, 1924    3 Sheets-Sheet 1

Inventor
Jack C. Carlton

By
Wood & Wood
Attorneys

Sept. 4, 1928.

J. C. CARLTON 1,683,528

CLUTCH MECHANISM FOR REVERSING GEAR

Filed April 23, 1924    3 Sheets-Sheet 2

Inventor
Jack C. Carlton

By
Attorneys

Sept. 4, 1928.
J. C. CARLTON
1,683,528
CLUTCH MECHANISM FOR REVERSING GEAR
Filed April 23, 1924   3 Sheets-Sheet 3
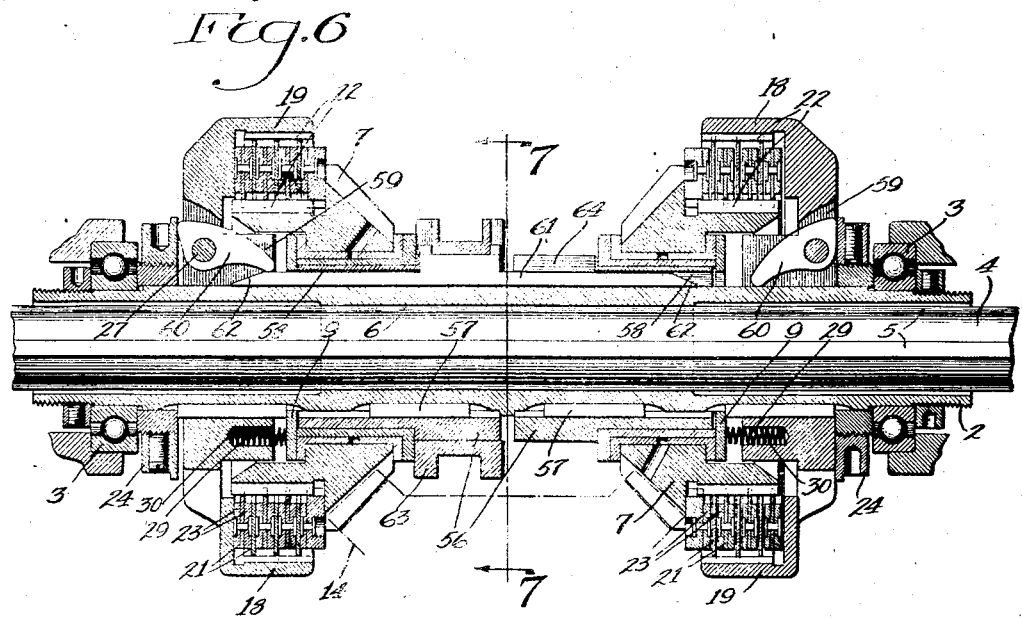
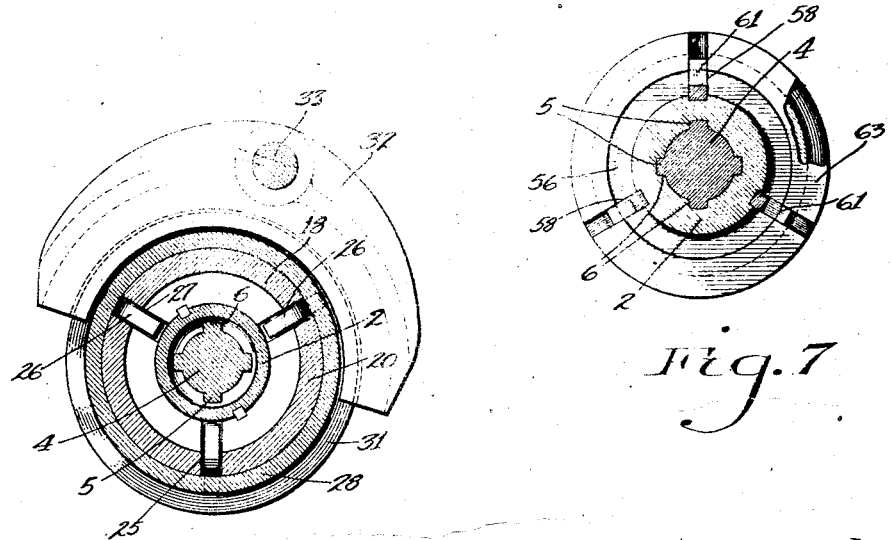
Inventor
Jack C. Carlton
By
Attorneys Patented Sept. 4, 1928.

1,683,528

UNITED STATES PATENT OFFICE.

JACK C. CARLTON, OF CINCINNATI, OHIO, ASSIGNOR TO THE CARLTON MACHINE TOOL COMPANY, OF CINCINNATI, OHIO, A CORPORATION OF OHIO.

CLUTCH MECHANISM FOR REVERSING GEAR.

Application filed April 23, 1924. Serial No. 708,555.

My invention relates to friction clutches of the class particularly adaptable for the reversing gear of a radial drill.

One object of my invention is to mount the clutch mechanism as a unit upon a tubular spindle having its opposite ends journaled in ball bearings with the power transmitting shaft extending through the sleeve and splined thereto, in order to permit translation of the clutch mechanism longitudinally of the shaft.

Another object of my invention is to provide a friction clutch in which the driving and driven members are held compressively together, by means of levers carried by one of said members.

Another object of my invention is to provide a friction clutch in which the driving and driven members are held compressively together by levers and are retracted by tension springs all carried by one of said members.

Another object of my invention is to provide a very efficient quick change reversing gear transmission for high speeds with the elements compactly combined.

Other objects and advantages relate to the utilization of the clutches for reversing gearing mechanism, for alternately transmittingly connecting a set of reversing gears, with the clutches and reversing gears mounted upon a sleeve or spindle, all of which will be more fully set forth in the description of the accompanying drawings, forming a part of this specification, in which drawings like reference characters denote corresponding parts throughout the several views, of which:

Figure 5 is a section on line 5—5, of Fig. 1.

Figure 6 is a side section showing a modified embodiment of my invention.

Figure 7 is a section on line 7—7, of Fig. 6.

My clutching and reversing mechanism comprises a housing, a sleeve spindle journaled in said housing with ball bearings, a driving shaft inside of said spindle and splined thereto, two opposing bevel gears mounted rotatably on said spindle, a third bevel gear in mesh with the opposing bevel gears, clutch members and friction discs adapted to engage said opposing bevel gears, fixed collars on said spindle and levers carried by said clutch members adapted to push said clutch members away from said fixed collars toward said bevel gears.

Figure 1:
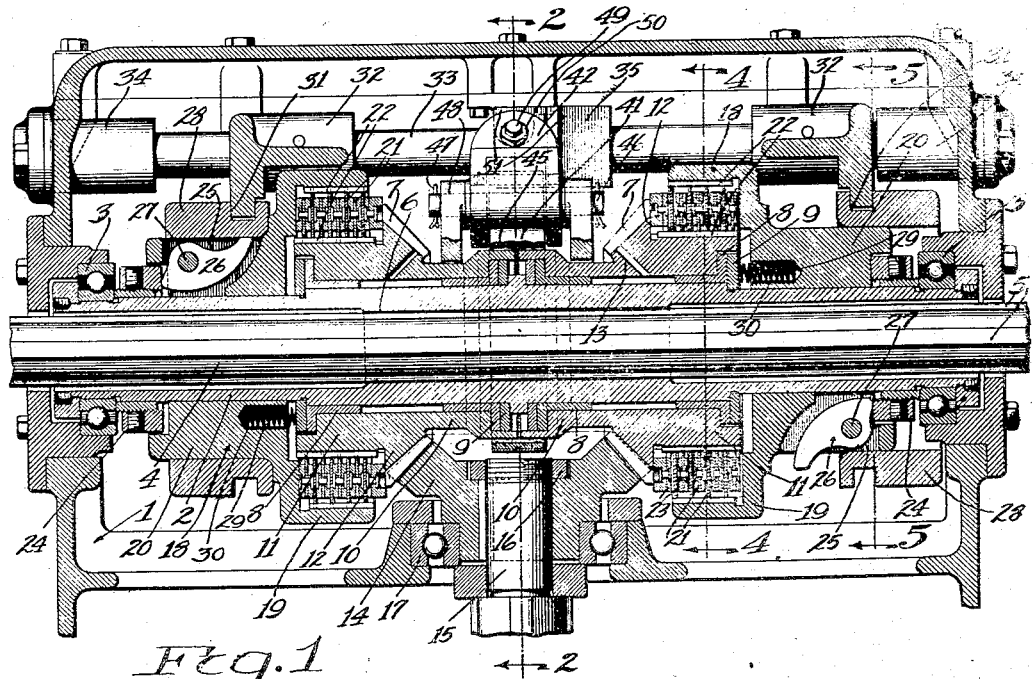
Figure 1 is a side sectional view.
Figure 2:
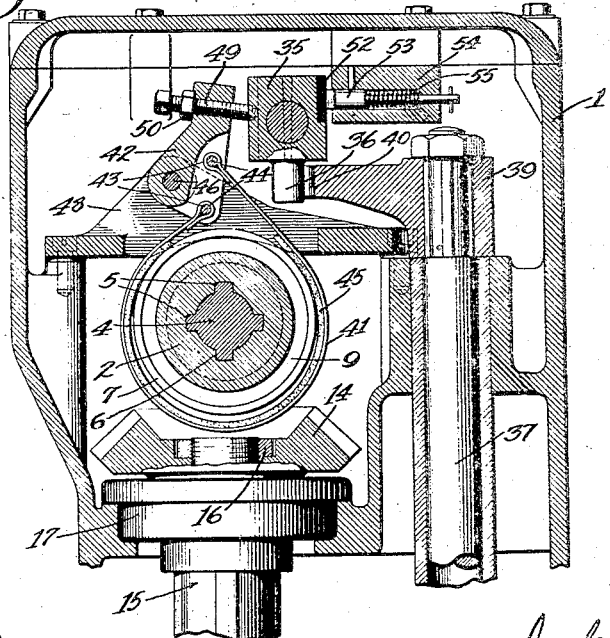
Figure 2 is a section on line 2—2, of Fig. 1.
Figure 3:
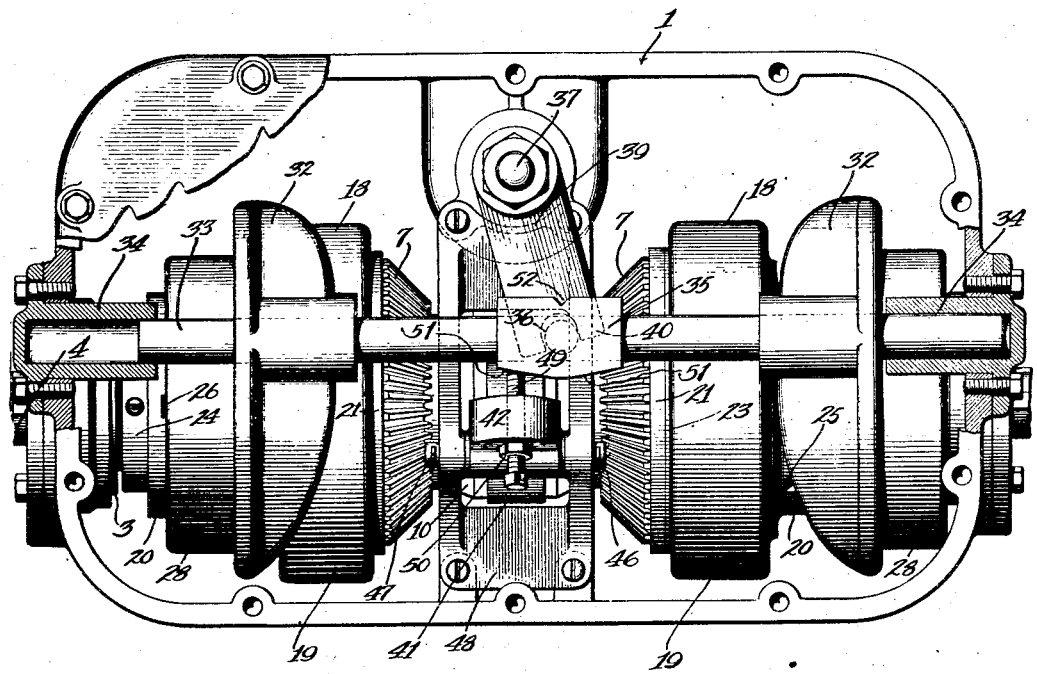
Figure 3 is a plan view with a portion of the housing broken away.
Figure 4:
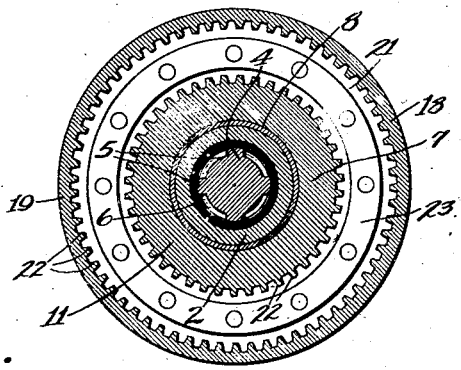
Figure 4 is a section on line 4—4, of Fig. 1.

In the device shown in Figure 1 the levers are actuated by shifter collars attached together and so spaced that only one bevel gear can be clutched at a time.

In Figure 6 the levers are actuated by a key of such length that only one bevel gear can be clutched at a time.

Springs are employed to retract the clutch member and the opposing bevel gears are provided with hubs around which extends a brake band. The shifter collars are joined by a rod on which is mounted a cam adapted to tighten said brake band when the clutch members are not functioning, i. e., in neutral. Thus I provide a clutching reversing mechanism as a compact unit.

More specifically I provide a housing 1 in which is journaled a sleeve spindle 2 the bearings 3 of said spindle being of the ball bearing raceway type. Through this spindle a concentric power or driving shaft 4 passes and the driving shaft and spindle together comprise the power element of my mechanism.

The driving shaft is provided with longitudinal ribs 5, in this case four in number, and the central portion of the spindle is provided with corresponding ribs 6 forming a splined connection between the two. The spindle 2 is counterturned in order to secure the parts mounted thereon from longitudinal motion. Near the center of said spindle are two opposing bevel gears 7 adapted to rotate freely on the spindle and provided with suitable anti-friction bushings 8 and collars 9. These bevel gears are provided with hub portions 10 extending toward one another, outwardly extending hub portions 11 and shoulder portions 12. The gears also have oil ducts 13. In mesh with both of these bevel gears is a third bevel gear 14 secured to a shaft 15 perpendicular to the first shaft and secured thereto by means of a disc 16 screwed onto the end of said shaft. This gear and shaft are also journaled in the housing 1 by means of a ball bearing raceway 17.

Mounted on the spindle 2 between the opposing bevel gears 7 and the bearings 3 are clutch members 18 having a sleeve portion 19 extending over the hub portions 11 of the bevel gears 7 and spaced therefrom, also hub portions 20 extending toward the spindle bearings 3. The clutch members 18 are splined to the spindle 2. Between the sleeve portions 19 of the clutch members 18 and the hub portions 11 of the opposing bevel gears 7 are a plurality of friction rings 21 alternately secured by means of teeth 22 to the sleeve portion 19 of the clutch member and the hub 11 of the bevel gear. These rings are preferably of metal and alternate rings have secured to their surfaces raybestos rings 23 which are slightly compressible. Thus friction clutches between the clutching members and the bevel gears are constituted.

Between the ball bearing raceways 3 and the hubs of the clutch member are leverage abutments, in this case adjustable collars 24 secured on the spindle against longitudinal motion. In recesses 25 in the hubs 20 of the clutch members 18 are mounted levers 26, in this case three in number. These levers are preferably of the bell crank type and have pins 27 as their fulcrums. One end of each of said levers pushes against one of the fixed collars or abutments and the other end of each of said levers extends through the outer cylindrical surface of the clutch hub.

About said clutch hubs are shifter collars 28 of hardened metal adapted to be moved longitudinally on said hubs and depress the extending ends of said levers, causing the opposite ends of said levers to push against the adjustable collars and force the clutch members against the friction rings, thereby clutching the clutch members and bevel gears together. These clutch members are retracted by means of springs 29 opposing the thrust of the levers also carried by the clutch hubs. These springs are located in cylindrical recesses 30 in the clutch hubs and press against the anti-friction collars 9 which are also held secure against longitudinal motion by the counterturning of the spindle 2. The shifter collars are provided with grooves 31 in their cylindrical surfaces into which fit the arms of yokes 32. These yokes 32 are mounted on a shifter rod 33 which has its ends engaged in sockets 34 in the housing 1. These yokes 32 are so spaced on the shifter rod 33 that only one bevel gear 7 can be clutched at a time.

At the center of the shifter rod is a block 35 having an outwardly extending cylindrical projection 36. Extending vertically through the housing 1 is a controlling or actuating rod 37 to which the original clutching reversing motive power is given by the operator of the machine. Splined to the top of said rod and held thereto by means of bolts 38 is an arm 39. This arm terminates in a yoke 40 the arms of which yoke embrace the cylindrical extension 36 of the block 35 on the shifter rod 33. Thus, when the actuating rod 37 is rotated the shifter rod 33 is translated and one or the other of the clutches thrown into or out of engagement.

*Braking mechanism.*

About the hubs 10 of the opposing bevel gears 7 is a flexible brake band 41 secured at its ends to a rock lever 42 by means of folding over the ends of the band into eyelets 43 adapted to fit over pins 44 on the rock lever 42. Between this band and the hubs of the gears themselves is a second flexible band of braking material 45 which may be replaced as it wears out. This rock lever 42 is pivotally mounted on a rod 46 secured by split pins 47 in a bracket 48 which is attached to the housing 1. The rock lever is traversed by a bolt 49 adjustably securable by a lock nut 50 and the end of this bolt is adapted to contact one surface of the block 35 on the shifter rod 33. This surface of the block constitutes two inclined surfaces 51 forming an apex in the center and thus rendering the surface a cam, so that when the shifter rod and block approach their center the rock lever is tilted and the brake band it tightened thereby bringing the bevel gears to a stop.

The face of the block opposite the cam surface is provided with a centrally located groove 52. A detent or wedge 53 slidably mounted in a bracket 54 is pressed against the surface of the block and into the groove when in position by means of a coil spring 55 under slight tension. This device is merely to enable the operator of the machine easily to locate the dead center or neutral position of the clutching and reversing mechanism.

*Alternate shifting mechanism.*

The embodiment of my invention shown in Figs. 6 and 7 is similar to that shown in the first five figures except that the hubs of the bevel gears and the sleeves of the clutch members are omitted and the lever actuating means is slightly varied. About the spindle and beneath the bevel gears, respectively, and their bushings, are sleeves 56 held to said spindle by keys 57. Additional keyways 58 are cut through these sleeves 56 and through the anti-friction collars, these keyways 58 opening into recesses 59 in the clutch members in which are located levers 60 corresponding in function to levers 26. In these keyways 58 are clutch actuating keys 61 with beveled surfaces 62 at their opposite ends adapted to operate the levers 60 selectively. About the sleeves 56 and secured to the actuating keys is a shifter collar 63 by means of which the keys are shifted and clutching accomplished. The sleeves have longitudinal slots 64 above the keyways 58 in order to permit the actuating keys 61 to be shifted by the collar from one side to another.

Thus I provide a compact clutching and reversing mechanism for radial drills adapted to be moved horizontally along a driving shaft and providing lever actuated and spring retracted selective friction clutches.

When the clutch mechanism is in idle or neutral position the clutch shifting rod 37 positions the arm 39 connected upon the end of the rod at right angles to the actuating rod 33, bringing the brake operating block 35, fixed on the actuating rod 33, at a point whereby its cam surfaces will have rocked the brake lever 42 a sufficient degree to draw the brake band 41 and apply the appropriate braking pressure upon the brake drums or hubs 10 of the reversing gears 7. Moving the actuating rod 33 to its extreme right or left positions for a clutch power control releases the brake lever 42 and brake band. The brake is therefore always applied when the shifting mechanism reaches a neutral position so that the rotation of the reversing gears is arrested wherever the clutch is shifted for a reversing or stopping control. This avoids clashing of the gears in changing from one direction of rotation to the reverse, or imparting any overrun motion to the driven gear 14 meshing with the reversing gears 7—7.

The actuating rod 33 connecting with the clutch controlling collars 28—28 moves the collars in alternate directions for alternate control of the clutches or friction discs.

As the clutches are the duplicate of one another this operation is the same, except relatively alternate, thus for a clutching operation the clutch collar is moved to engage the same over the free ends of the series of levers 26, pivoted within the hub 20 of the clutch member 19 depressing the levers causing the same to engage with the stop collar 24 on the sleeve 2 forcing the clutch member 19 forwardly for compressing the friction discs transmittingly connecting the sleeve 2 with the selected reversing gear 7. Moving the collar 28 in an opposite direction releases the levers 26 permitting the clutch member to be moved under the releasing pressure of the springs 29, releasing the friction disc compression. The stop collars 24 are adjustable upon the sleeve 2 for regulating the degree of disc compression.

Having described my invention, I claim:

In a friction clutch, a sleeve rotatably journaled, a first clutch member journaled upon said sleeve, and confined thereon against axial displacement, a second clutch member, slidable upon and rotatable with said sleeve, friction discs interposed between said clutch members, and housed thereby, a plurality of levers mounted in a hub of said second clutch member, for moving said second clutch member to bring the clutch members and discs into compression, an adjustable abutment on said sleeve, against which said levers engage, and means slidable axially of the sleeve for simultaneously actuating said levers.

In witness whereof, I hereunto subscribe my name.

JACK C. CARLTON.